United States Patent [19]

Sugimori

[11] Patent Number: 4,686,305

[45] Date of Patent: Aug. 11, 1987

[54] 4'-SUBSTITUTED-PHENYL α-METHYL-β-(4-SUBSTITUTED-PHENYL) PROPIONATES

[75] Inventor: Shigeru Sugimori, Fujisawa, Japan

[73] Assignee: Chisso Corporation, Osaka, Japan

[21] Appl. No.: 709,398

[22] Filed: Mar. 7, 1985

[30] Foreign Application Priority Data

Mar. 7, 1984 [JP] Japan .................................. 59-43619
Mar. 22, 1984 [JP] Japan .................................. 59-54956
Mar. 24, 1984 [JP] Japan .................................. 59-56925

[51] Int. Cl.$^4$ .............................................. C07C 69/76
[52] U.S. Cl. ...................................... 560/75; 560/108; 252/299; 252/299.61; 558/411; 558/414
[58] Field of Search .................. 560/75, 108; 252/299, 252/299.61; 558/411, 414

[56] References Cited

PUBLICATIONS

Pelzl, G., Z. Chem., 17 (7), 264–5, 1977.
Pelzl, G., Z. Chem., 17 (8), 294–5, 1977.

Primary Examiner—Paul J. Killos
Attorney, Agent, or Firm—Fay, Sharpe, Beall, Fagan, Minnich & McKee

[57] ABSTRACT

A novel compound useful as a component of liquid crystal compositions, for lowering their melting point without lowering so much the clearing point in the mesomorphic range of the compositions, and a liquid crystal composition containing the same are provided, which compound is expressed by the general formula

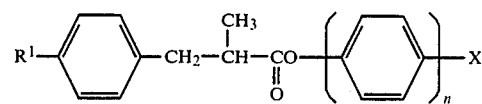

wherein $R^1$ is alkyl or alkoxy each of 1–15 C; n is 1 or 2; and X is

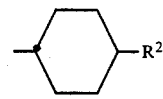

wherein $R^2$ is alkyl or alkoxy each of 1–15 C, when n is 1, or F, Cl, CN, alkyl or alkoxy each of 1–15 C when n is 2.

4 Claims, No Drawings

4'-SUBSTITUTED-PHENYL α-METHYL-β-(4-SUBSTITUTED-PHENYL) PROPIONATES

BACKGROUND OF THE INVENTION

This invention relates to novel 4'-substituted-phenyl α-methyl-β-(4-substituted-phenyl)propionates, and a liquid crystal compositon containing the same.

Display elements using liquid crystals have been broadly used for watches, electric calculators, etc. These liquid crystal display elements utilize the optical anisotropy and dielectric anisotropy of liquid crystal substances, and their liquid crystal phases include nematic liquid crystal phase, smectic liquid crystal phase and cholesteric liquid crystal phase. Among display elements utilizing liquid crystals of these phases, those utilizing liquid crystals of the nematic liquid phase have been most broadly used practically. The display elements include those of TN type (twisted nematic type), DS type (dynamic scattering type), guest-host type, DAP type, etc. and properties required for liquid crystal compounds used for the respective types vary. Liquid crystal compounds used for these display elements are preferred to be those which exhibit the liquid crystalphase in the temperature range as broad as possible, but it is the present status that no single compound satisfies such condition; hence mixtures of several kinds of liquid crystal compounds and if required, non-liquid crystal compounds have been practically used. These compounds are required to be stable to moisture, light, heat, air, etc. and further, it is preferred that threshold voltage and saturation voltage required for driving the display elements be as low as possible.

Heretofore, compounds exhibiting liquid crystal phases and/or compounds used as a component for liquid crystal compositions, which have —COO— linkage between single rings, have been well known.

The present inventors previously disclosed compounds having the general formula

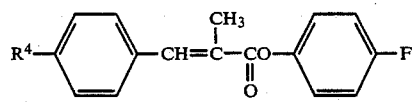

in Japanese patent application laid-open NO. Sho 57-81440/1982.

The object of the present invention is to provide novel compounds useful as a coponent for liquid crystal compositions, for lowering their melting point without lowering so much the clearing point in the mesomorphoric range of the compositions, and a liquid crystal composition containing the same.

The above compounds also aim at improving the stability of the above-mentioned 4'-fluorophenyl 4-alkoxy-α-methyl cynnamates disclosed by the present inventors.

SUMMARY OF THE INVENTION

The present invention recides in the following two main aspects:

(1) 4'-Substituted-phenyl α-methyl-β-(4-substituted-phenyl)propionates expressed by the general formula

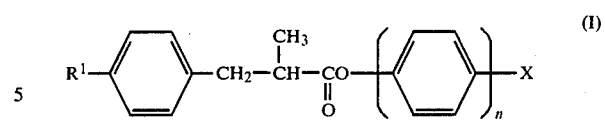

wherein $R^1$ represents an alkyl group or an alkoxy group each having 1 to 15 carbon atoms; n is 1 or 2; and X represents

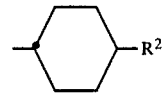

wherein $R^2$ represents an alkyl group or an alkoxy group each having 1 to 15 carbon atokms, in the case of N=1, or F, Cl, CN, an alkyl group or an alkoxy group each having 1 to 15 carbon atoms, in the case of n=2.

(2) A liquid crystal composition comprising a mixture of comounds at least one of which is a compound as set forth in the above item (1).

The above item (1) further has the following two embodiments: (1') 4'-Substituted phenyl α-methyl-β-(4-substituted-phenyl)propionates according to the above item (1) wherein n represents 1 and X represents

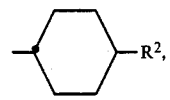

or n represents 2 and X represents an alkyl group or an alkoxy group each having 1 to 15 carbon atoms in the general formula (I).

DETAILED DESCRIPTION OF THE INVENTION

The compounds of the present invention are useful as a component of liquid crystal compositions and can extend the mesomorphic range of liquid crystal compositiona toward lower temperature region and also reduce their viscosity.

Next, preparation of the compounds of the present invention will be illustrated below.

An α-methyl-β-(4-substituted-phenyl)propionic acid chloride is reacted with a 4-substituted phenol compound in the presence of pyridine to obtain the objective a 4'-substituted phenyl α-methyl-β-(4-substituted-phenyl)propionate.

The above prepatation is illustrated by the following equation:

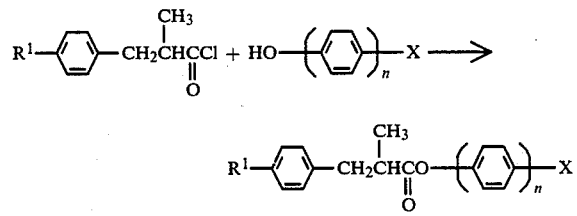

In the above equation, $R^1$, n and X are as defined above.

Examples of the above 4-substituted phenol compounds are 4-hydroxy-4'-substituted-biphenyl etc..

The liquid crystal composition of the present invention consist of at least one compound of the oresent invention expressed by the above formula (I) and compounds which are compatible therewith and can form a liquid crystal composition, such ester compounds, biphenyl compounds, phenylcyclohexane compounds, phenylpyrimidine compounds, etc. The liquid crystal composition of the present invention is superior in stability to air, light, heat, moisture, etc.

The present invention will be described in more detail by way of Examples wherein nematic phase, transparent phase and melting point are abbreviated to N, I and m.p., respectively.

EXAMPLE 1

Preparation of 4'-fluoro-4-biphenylyl α-methyl-β-(4-hexyloxyphenyl)propionate

4-Hydroxy-4'-fluorobiphenyl (2.1 g, 0.012 mol) was dissolved in pyridine (10 ml), and to the solution was added β-(4-hexyloxyphenyl)propionic acid chloride (3.0 g, 0.01 mol) with sufficient shaking, followed by allowing the resulting reaction solution to stand overnight, thereafter pouring it in water (100 ml), extracting the resulting oily material with toluene (100 ml), washing the toluene layer with 6N-HCl and then with 2N-NaOH, further washing with water till the washing liquid became neutral, filtering, distilling off toluene under reduced pressure, and recrystallizing residual crystals from ethanol to obtain the objective 4'-fluoro-4-biphenylyl α-methyl-β-(4-hexyloxyphenyl)propionate (2.1 g, yield 48%). m.p.: 78.4°–79.5° C. N-I point: 38.1° C.

EXAMPLES 2-9

(Examples 4-9: Comparative examples)

Various compounds of the present invention were prepared in the same manner as in Example 1. The results are shown in Table 1 together with those of Example 1.

EXAMPLE 10

Preparation of 4'-cyano-4-biphenylyl α-methyl-β-(4-butyloxyphenyl)propionate

4-Hydroxy-4-cyanobiphenyl (2.3 g, 0.012 mol) was dissolved in pyridine (10 ml), and to the solution was added α-methyl-β-(4-butyloxyphenl)propionic acid chloride (2.7 g, 0.01 mol) with sufficient shaking, followed by allowing the resulting reaction solution to stand overnight, thereafter pouring it in water, extracting the resultingoily material with toluene (100 ml), washing the toluene layer with 6N-HCl, then with 2N-NaOH and further with water till the washing water became neutral, filtering, distilling off toluene under reduced pressure, and recrystallizing residual crystals from ethanol to obtain the objective 4'-cyano-4-biphenylyl α-methyl-β-(4-butyloxyphenyl)propionate (2.6 g, yield 61%). m.p.: 76.1°–77.1° C. N-I point: 59.0° C.

(EXAMPLE 13: COMPARATIVE EXAMPLE)

Compounds of the present invention were prepared in the same manner as in Exaple 10. The results are shown in Table 1 together with those of Example 10.

TABLE 1

$$R-\underset{}{\bigcirc}-CH_2-\underset{CH_3}{\overset{|}{CH}}-\underset{\underset{O}{\overset{\|}{}}}{CO}-\underset{}{\bigcirc}-X$$

| Example | R | X | m.p. | N-I point |
|---|---|---|---|---|
| 1 | n-C$_6$H$_{13}$O | ⌬-F | 78.4 ~ 79.5 | (38.1) |
| 2 | n-C$_5$H$_{11}$O | ⌬-F | 74.9 ~ 76.1 | (33.8) |
| 3 | n-C$_4$H$_9$O | ⌬-F | 72.5 ~ 76.2 | — |
| 4 | n-C$_6$H$_{13}$O | F | Oily at room temperature | — |
| 5 | n-C$_5$H$_{11}$O | F | Oily at room temperature | — |
| 6 | n-C$_4$H$_9$O | F | Oily at room temperature | — |
| 7 | n-C$_6$H$_{13}$O | Cl | Oily at room temperature | — |
| 8 | n-C$_5$H$_{11}$O | Cl | Oily at room temperature | — |
| 9 | n-C$_4$H$_9$O | Cl | Oily at room temperature | — |

TABLE 1-continued

R—⟨benzene⟩—CH$_2$—CH(CH$_3$)—CO—O—⟨benzene⟩—X

| Example | R | X | Phase transition point (°C.) m.p. | N-I point |
|---|---|---|---|---|
| 10 | n-C$_4$H$_9$O | ⟨phenyl⟩—CN | 76.1 ~ 77.0 | (59.0) |
| 11 | n-C$_5$H$_{11}$O | ⟨phenyl⟩—CN | 83.5 ~ 84.4 | (53.8) |
| 12 | n-C$_6$H$_{13}$O | ⟨phenyl⟩—CN | 73.5 ~ 75.0 | (59.5) |
| 13 | n-C$_5$H$_{11}$O | CN | Oily at room temperature | — |

Note:
( ) in Table 1 indicates that the liquid crystal is monotropic.
The compounds having two rings shown in the examples 5–9 and 13, (comparative examples) are oily at the room temperature.

EXAMPLE 14

Preparation of 4'-propyl-4-biphenylyl α-methyl-β-(4-pentyloxyphenyl)propionate

4-Hydroxy-4'-propylbiphenyl (2.5 g, 0.012 mol) was dissolved in pyridine (10 ml) and to the solution was added β-(4-pentyloxyphenyl)propionic acid chloride (2.5 g, 0.01 mol) with sufficient shaking, followed by allowing the resulting reaction solution to stand overnight, pouring it in water (100 ml), extracting the resulting oily material with toluene (100 ml), washing the toluene layer with 6N-HCl, then with 2N-NaOH and further with water till the washing water became neutral, filtering, distilling off toluene under reduced pressure, and recrystallizing residual crystals from ethanol to obtain the objective 4'-propyl-4-biphenylyl α-methyl-β-(4-pentyloxyphenyl)propionate. m.p. 84.0°–84.5° C. N-I point 46.0° C. (extrapolated value).

EXAMPLES 15–20

(Examples 19–20 Comparative examples)

Compounds of the present invention were prepared in the same manner as in Example 14. The results are shown in Table 2 together with those of Example 14.

TABLE 2

R—⟨benzene⟩—CH$_2$—CH(CH$_3$)—CO—O—⟨benzene⟩—X

| Example | R | X | Phase transition point (°C.) m.p. | N-I point |
|---|---|---|---|---|
| 14 | n-C$_5$H$_{11}$O | ⟨phenyl⟩—n-C$_3$H$_7$ | 84.0 ~ 84.5 | (46.0) |
| 15 | n-C$_5$H$_{11}$O | ⟨cyclohexyl⟩—n-C$_3$H$_7$ | 71.6 ~ 73.1 | (38.0) |
| 16 | n-C$_4$H$_9$O | ⟨phenyl⟩—n-C$_4$H$_9$ | 80.4 ~ 83.4 | (40.0) |
| 17 | n-C$_4$H$_9$O | ⟨phenyl⟩—n-C$_5$H$_{11}$ | 81.2 ~ 84.5 | (48.0) |

TABLE 2-continued

R—⌬—CH₂—CH(CH₃)—CO—O—⌬—X

| Example | R | X | Phase transition point (°C.) m.p. | N-I point |
|---|---|---|---|---|
| 18 | n-C₆H₁₃O | ⌬—n-C₃H₇ | 74.2 ~ 74.5 | (41.0) |
| 19 | n-C₇H₁₅O | n-C₄H₉O | 52.0 ~ 53.0 | (−2.6) |
| 20 | n-C₇H₁₅O | n-C₅H₁₁O | 28.2 ~ 30.4 | (−3.0) |

Note:
( ) in Table indicates that the liquid crystal is monotropic.
The compounds having two rings shown in the examples 19 and 20 (comparative examples) show N-I points lower than 0° C.

USE EXAMPLE 1

A liquid crystal composition (A) consisting of 4-pentyl-4'-cyanobiphenyl 51% by weight, 4-heptyl-4'-cyanobiphenyl 32% by weight and 4-octyloxy-4'-cyanobiphenyl 17% by weight, has a nematic, mesomorphic range of 0°–44° C. A composition consisting of 9 parts by weight of the above composition (A) and one part by weight of a compound of the present invention prepared in Example 1, i.e. 4'-fluoro-4-biphenylyl α-methyl-β-(4-hexyloxyphenyl)-propionate, exhibited a nematic mesomorphic range of −10°–+43° C., that is, the lower temperature regin (m.p.) dropped.

USE EXAMPLE 2

A composition consisting of 9 parts by weight of the liquid crystal composition (A) in Use example 1 and one part by weight of a compound of the present invention prepared in Example 10; 4'-cyano-4-biphenylyl α-methyl-β-(4-butyloxyphenyl)propionate exhibited a nematic mesomorphic range of −5°–+45° C., that is, the range was extended to a higher temperature region and a lower temperature region.

USE EXAMPLE 3

A composition consisting of 9 parts by weight of the composition (A) in Use example 1 and one part by weight of a compound of the present invention prepared in Example 14, i.e. 4'-propyl-4-biphenylyl α-methyl-β-(4-pentyloxyphenyl)propionate exhibited a nematic mesomorphic range of −5°–+44° C., that is, the range was extended to a lower temperature region.

What we claim is:

1. 4-Substituted-phenyl α-methyl-β-(4-substituted-phenyl)propionates expressed by the general formula

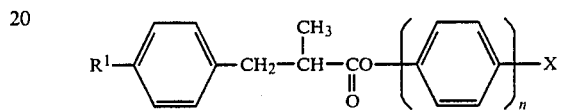

wherein $R^1$ represents an alkyl group or an alkoxy group each having 1 to 15 carbon atoms; n is 1 or 2; and X represnts

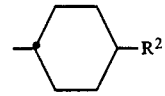

wherein $R^2$ represents an alkyl group or an alkyoxy group having 1 to 15 carbon atoms, when n is 1, or F, Cl, CN, an alkyl group or an alkoxy group each having 1 to 15 carbon atoms, when n is 2.

2. 4-Substituted phenyl α-methyl-β(4-substituted-phenyl)propionates according to claim 1 wherein n represents 1 and X represents

in the general formula (I).

3. 4-Substituted phenyl α-methyl-β(4-substituted-phenyl)propionates according to claim 1 wherein n represents 2 and X represents an alkyl group or an alkoxy group each having 1 to 15 carbon atoms in the general formula (I).

4. A liquid crystal corpisition comprising a mixture of compounds at least one of which is a compound as set forth in claim 1.

* * * * *